United States Patent
Mekki et al.

(10) Patent No.: US 12,165,511 B2
(45) Date of Patent: Dec. 10, 2024

(54) APPARATUS, SYSTEM AND METHOD FOR DETECTING SPEED BUMPS AND POTHOLES ON A ROAD

(71) Applicant: HUAWEI TECHNOLOGIES CO., LTD., Shenzhen (CN)

(72) Inventors: Sami Mekki, Boulogne Billancourt (FR); Mustapha Amara, Boulogne Billancourt (FR); Songyu Yuan, Shenzhen (CN); Yutong Zhu, Shenzhen (CN); Zhixuan Wei, Shenzhen (CN); Xueming Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 18/073,332

(22) Filed: Dec. 1, 2022

(65) Prior Publication Data

US 2023/0169858 A1    Jun. 1, 2023

Related U.S. Application Data

(63) Continuation of application No. PCT/CN2020/093993, filed on Jun. 2, 2020.

(51) Int. Cl.
G08G 1/00        (2006.01)
B60Q 9/00        (2006.01)
(Continued)

(52) U.S. Cl.
CPC ........... *G08G 1/09626* (2013.01); *B60Q 9/00* (2013.01); *G01B 21/30* (2013.01)

(58) Field of Classification Search
CPC ...... G08G 1/09626; B60Q 9/00; G01B 21/30; B60W 2420/408; B60W 40/06;
(Continued)

(56) References Cited

U.S. PATENT DOCUMENTS 9,129,523 B2 *  9/2015  Martin .................... G01S 7/295
9,530,055 B2 * 12/2016  Goodwin .............. G01S 7/4802
(Continued)

FOREIGN PATENT DOCUMENTS

CN    101714211 A    5/2010
CN    102708354 A    10/2012
(Continued)

OTHER PUBLICATIONS

Fernandez et al., "Free Space and Speed Humps Detection using Lidar and Vision for Urban Autonomous Navigation," 2012 Intelligent Vehicles Symposium, Alcala de Henares, Spain, Total 6 pages, IEEE, Institute of Electrical and Electronics Engineers, New York, New York (Jun. 3-7, 2012).

(Continued)

*Primary Examiner* — Toan N Pham
(74) *Attorney, Agent, or Firm* — Leydig, Voit & Mayer, Ltd.

(57) ABSTRACT

A sensing apparatus for detecting speed bumps or potholes on a road is disclosed. The sensing apparatus comprises a telemetric sensing system configured to collect a plurality of position vectors by telemetric sensing of a road surface, wherein each position vector extends from a common origin to a respective point on the road surface and wherein each position vector has a length and a direction. The sensing apparatus further comprises a processing circuitry configured to detect a road flatness exception by evaluating the lengths of the position vectors. Thus, an improved apparatus for detecting road irregularities such as speed bumps or potholes on a road is provided. The sensing apparatus remains functional in low light conditions, e.g., at night, and also in the presence of reverberation of the vehicle. In an implementation form, the telemetric sensing system may comprise one or more radar sensors and/or one or more lidar (Continued)

sensors for collecting the plurality of position vectors using radar and/or lidar measurements.

20 Claims, 17 Drawing Sheets

(51) Int. Cl.
    *G01B 21/30*     (2006.01)
    *G08G 1/0962*     (2006.01)

(58) Field of Classification Search
    CPC ........ G01S 7/41; G01S 7/4802; G01S 13/931; G01S 17/931; E01C 23/01; G01C 21/3822
    See application file for complete search history.

(56) References Cited

U.S. PATENT DOCUMENTS

| | | | |
|---|---|---|---|
| 2011/0060478 A1 | 3/2011 | Nickolaou | |
| 2013/0251194 A1* | 9/2013 | Schamp | G06T 7/11 382/199 |
| 2015/0291177 A1 | 10/2015 | Lee | |
| 2017/0176990 A1 | 6/2017 | Keller et al. | |
| 2019/0170511 A1* | 6/2019 | Maucher | G01C 7/04 |
| 2020/0134773 A1* | 4/2020 | Pinter | G01N 21/8806 |

FOREIGN PATENT DOCUMENTS

| | | | |
|---|---|---|---|
| CN | 108230421 A | 6/2018 | |
| DE | 102007050056 A1 | 4/2009 | |
| IN | 107507202 A | 12/2017 | |
| IN | 110015304 A | 7/2019 | |
| JP | 2019021028 A | 2/2019 | |
| KR | 101491238 B1 | 2/2015 | |
| KR | 101517695 B1 | 5/2015 | |
| WO | WO-2017157798 A1 * | 9/2017 | B60W 40/02 |

OTHER PUBLICATIONS

Yun et al., "Speed-Bump Detection for Autonomous Vehicles by Lidar and Camera," Journal of Electrical Engineering & Technology, English Abstract, SpringerLink, https://link.springer.com/article/10.1007/s42835-019-00225-7, Total 8 pages (Jun. 2019).

Kim et al., "A Novel On-Road Vehicle Detection Method Using πHOG," IEEE Transactions on Intelligent Transportation Systems, vol. 16, No. 6, Total 16 pages, Institute of Electrical and Electronics Engineers, New York, New York (Dec. 2015).

\* cited by examiner

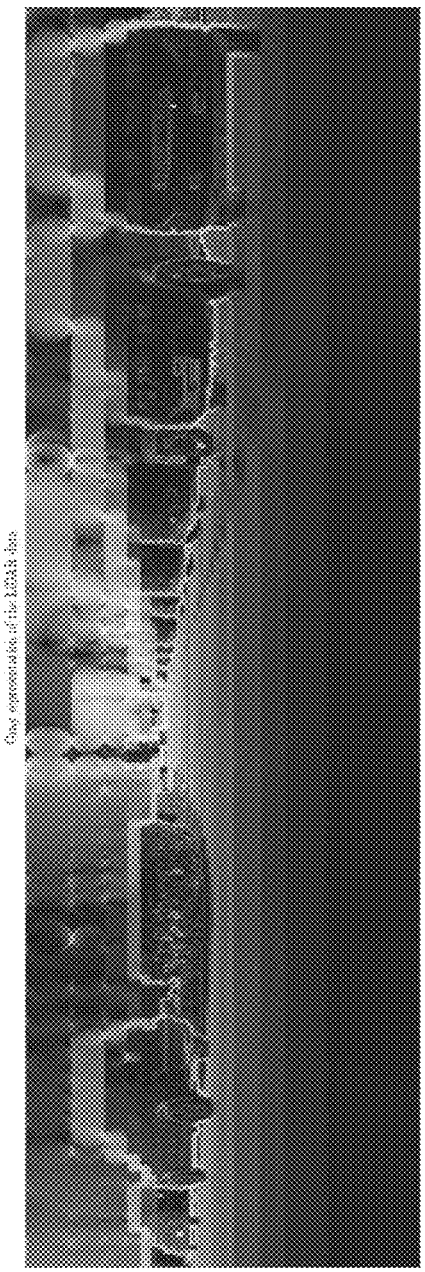
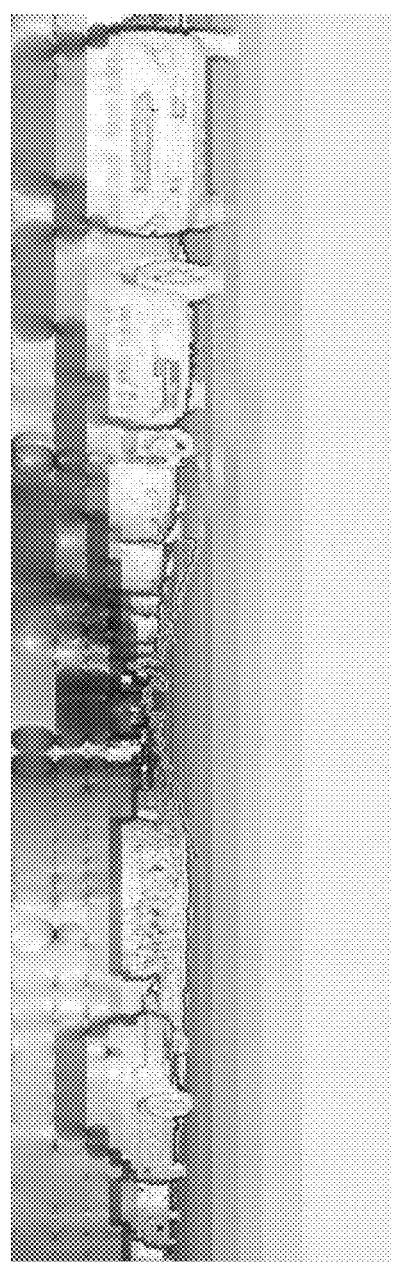
Fig. 8A
Fig. 8B

APPARATUS, SYSTEM AND METHOD FOR DETECTING SPEED BUMPS AND POTHOLES ON A ROAD

CROSS-REFERENCE TO RELATED APPLICATIONS

This application is a continuation of International Application No. PCT/CN2020/093993, filed on Jun. 2, 2020, the disclosure of which is hereby incorporated by reference in its entirety.

TECHNICAL FIELD

The disclosure relates to sensing technology. More specifically, the disclosure relates to an apparatus, a system, and a method for detecting road irregularities, such as speed bumps or potholes, on a road.

BACKGROUND

Advanced driver assistance systems and autonomous self-driving systems are being deployed in more and more vehicles. Such systems implement a various functions using telemetric systems and sensors embedded in the vehicle, such as cameras, radar sensors, lidar sensors, Global Positioning System (GPS) sensors and the like.

One challenge for advanced driver assistance systems and autonomous self-driving systems is the detection of road irregularities, such as speed bumps or potholes, on the road ahead of the vehicle in order to be able to take appropriate action, such as slowing down the vehicle. There have been some attempts to detect and identify traffic indicators such as road signs, traffic lights, and the like as well as attempts to detect other moving vehicles by an advanced driver assistance system or autonomous self-driving system based on image processing techniques. However, in addition to these well identified and recognizable objects on or near the road, roads often exhibit irregularities that are recognized less easily, such as speed bumps or potholes, and these can be a potential hazard to a vehicle.

Many conventional approaches for speed bump detection, as disclosed, for instance, in United States Patent Application No. US2015/0291177, Japan Patent Application No. JP2019021028, and Korean Patent Nos. KR101491238 and KR101517695, rely to a certain degree on image data and image processing techniques, e.g., the processing of the image data obtained by one or more cameras of the vehicle. One factor for the performance of techniques which rely on image data and image processing is the quality of the image data. Therefore, these techniques can fail when driving at night, for example, or in case of reverberation on the road.

SUMMARY

It is an objective of the present disclosure to provide an improved apparatus, system, and method for detecting road irregularities, such as speed bumps or potholes on a road.

The foregoing and other objectives are achieved by the subject matter of the independent claims. Further implementation forms are apparent from the dependent claims, the description and the figures.

According to a first aspect a sensing apparatus for detecting speed bumps or potholes on a road is provided. The sensing apparatus comprises a telemetric sensing system configured to collect a plurality of position vectors by telemetric sensing of a road surface, wherein each position vector extends from a common origin to a respective point on the road surface and wherein each position vector has a length (e.g., its norm) and a direction. The sensing apparatus further comprises a processing circuitry configured to detect a road flatness exception by evaluating the lengths of the position vectors. Thus, an improved apparatus for detecting road irregularities such as speed bumps or potholes on a road is provided, because different to the conventional approaches relying on image data and processing of these image data the performance of the sensing apparatus according to the first aspect is not negatively affected by circumstances resulting in bad image quality, such as experienced when driving at night or in case of reverberation on the road.

In an implementation form, the telemetric sensing system may comprise one or more radar sensors and/or one or more lidar sensors for collecting the plurality of position vectors using radar and/or lidar measurements.

In a further possible implementation form of the first aspect, the direction of each position vector comprises a polar angle (e.g., elevational angle) and an azimuth angle.

In a further possible implementation form of the first aspect, the processing circuitry is configured to evaluate the lengths of the position vectors by (a) evaluating deviations of the lengths of the position vectors with respect to reference lengths corresponding to a hypothetical flat road surface, or (b) evaluating variations of the lengths of position vectors.

In a further possible implementation form of the first aspect, evaluating variations of the lengths of position vectors comprises evaluating a directional derivate of a length function, wherein the length function is an interpolation of the lengths of the position vectors on an angular domain.

In a further possible implementation form of the first aspect, evaluating variations of the lengths of position vectors comprises evaluating the mathematical expression $$10\left(\log_{10}\left(1 + \left|\frac{\partial \rho}{\partial \theta}\right|\right) + \log_{10}\left(1 + \left|\frac{\partial \rho}{\partial \phi}\right|\right)\right),$$

wherein ρ denotes the length function, θ denotes an azimuth angle and φ denotes a polar angle.

In a further possible implementation form of the first aspect, collecting the plurality of position vectors comprises transforming each of the position vectors from Cartesian coordinates to spherical coordinates.

In a further possible implementation form of the first aspect, the telemetric sensing system is configured to collect the plurality of position vectors such that a plurality of subsets of the plurality of position vectors have the same polar angle.

In a further possible implementation form of the first aspect, the processing circuitry is further configured to determine a length for a plurality of interpolation vectors based on an interpolation of the length of one or more position vectors having a larger polar angle and the length of one or more position vectors having a smaller polar angle.

In a further possible implementation form of the first aspect, the processing circuitry is configured to generate on the basis of the plurality of position vectors and the plurality of interpolation vectors a two-dimensional data array, e.g., an image representation of the data, wherein the dimensions of each element of the data array correspond to the azimuth angle and the polar angle of a corresponding position vector or interpolation vector and wherein a value of each element of the data array is associated with the variation of the length function for the respective azimuth angle and polar angle.

In a further possible implementation form of the first aspect, the processing circuitry is further configured to perform a grayscale conversion of the two-dimensional data array.

In a further possible implementation form of the first aspect, the processing circuitry is configured to detect the road flatness exception on the basis of a contour detection algorithm configured to detect contours in the two-dimensional data array.

According to a second aspect, an advanced driver assistance system for a vehicle is provided. The advanced driver assistance system according to the second aspect comprises a sensing apparatus according to the first aspect, wherein the advanced driver assistance system is configured to generate an alert message or signal responsive to the sensing apparatus detecting a speed bump or a pothole on the road ahead of the vehicle.

According to a third aspect, a sensing method for detecting speed bumps or potholes on a road is provided. The sensing method comprises the step of collecting a plurality of position vectors by telemetric sensing of a road surface, wherein each position vector extends from a common origin to a respective point on the road surface and each position vector has a length and a direction. Moreover, the sensing method comprises the step of detecting a road flatness exception by evaluating the lengths of the position vectors. Thus, an improved method for detecting road irregularities such as speed bumps or potholes on a road is provided, because different to the conventional approaches relying on image data and processing of these image data the performance of the sensing apparatus according to the first aspect is not negatively affected by circumstances resulting in bad image quality, such as experienced when driving at night or in case of reverberation on the road.

The sensing method according to the third aspect of the present disclosure can be performed by the sensing apparatus according to the first aspect of the present disclosure and the advanced driver assistance system according to the second aspect of the present disclosure. Thus, further features of the sensing method according to the third aspect of the present disclosure result directly from the functionality of the sensing apparatus according to the first aspect of the present disclosure and/or the advanced driver assistance system according to the second aspect of the present disclosure as well as their different implementation forms described above and below.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 8A shows a gray converted version of the intensity map of FIG. 7C;

FIG. 8B shows the intensity map of FIG. 8A as well as a contour identified therein by a sensing apparatus, according to an embodiment of the disclosure;

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
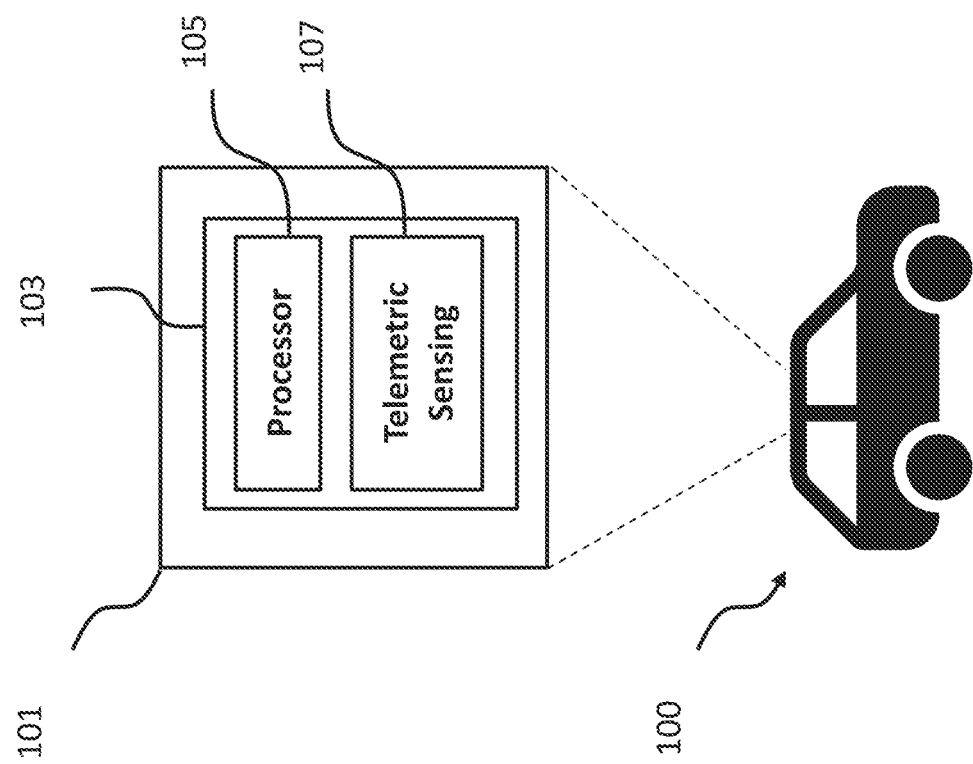
FIG. 1 is a schematic diagram illustrating a sensing apparatus implemented as part of an advanced driver assistance system of a vehicle, according to an embodiment of the disclosure.

FIG. 1 is a schematic diagram illustrating a sensing apparatus 103 implemented as part of an advanced driver assistance system 101 of a vehicle 100, according to an embodiment of the disclosure. As will be described in more detail below, the sensing apparatus 103 is configured to detect speed bumps, potholes, or other kind of road irregularities on a road the vehicle 100 is driving on. To this end, the sensing apparatus 103 comprises a processing circuitry 105, such as one or more processors 105 as well as a telemetric sensing system 107. In an embodiment, the telemetric sensing system 107 may comprise one or more radar sensors 107 and/or one or more lidar sensors 107 configured to obtain radar and/or lidar measurements of the environment of the vehicle 100.

As will be described in more detail below, the telemetric sensing system 107 (e.g., the one or more radar and/or lidar sensors 107) is configured to collect a plurality of position vectors by telemetric sensing (e.g., radar and/or lidar sensing) of the surface of the road the vehicle 100 is driving on. Each position vector extends from a common origin defined by the telemetric sensing system 107 (e.g., the position(s) of the one or more radar and/or lidar sensors 107 on the vehicle 100) to a respective point on the road surface, wherein each position vector has a length and a direction. On the basis of these position vectors collected by the telemetric sensing system 107, the processing circuitry 105 of the sensing apparatus 103 is configured to detect a road flatness exception by evaluating the lengths of the position vectors, as will be described in more detail in the context of FIG. 2 and the additional figures. In an embodiment, the processing circuitry 105 of the sensing apparatus 103 is configured to evaluate the lengths of the position vectors by (a) evaluating deviations of the lengths of the position vectors with respect to reference lengths corresponding to a hypothetical flat road surface, or (b) evaluating variations of the lengths of the position vectors.

Figure 2:
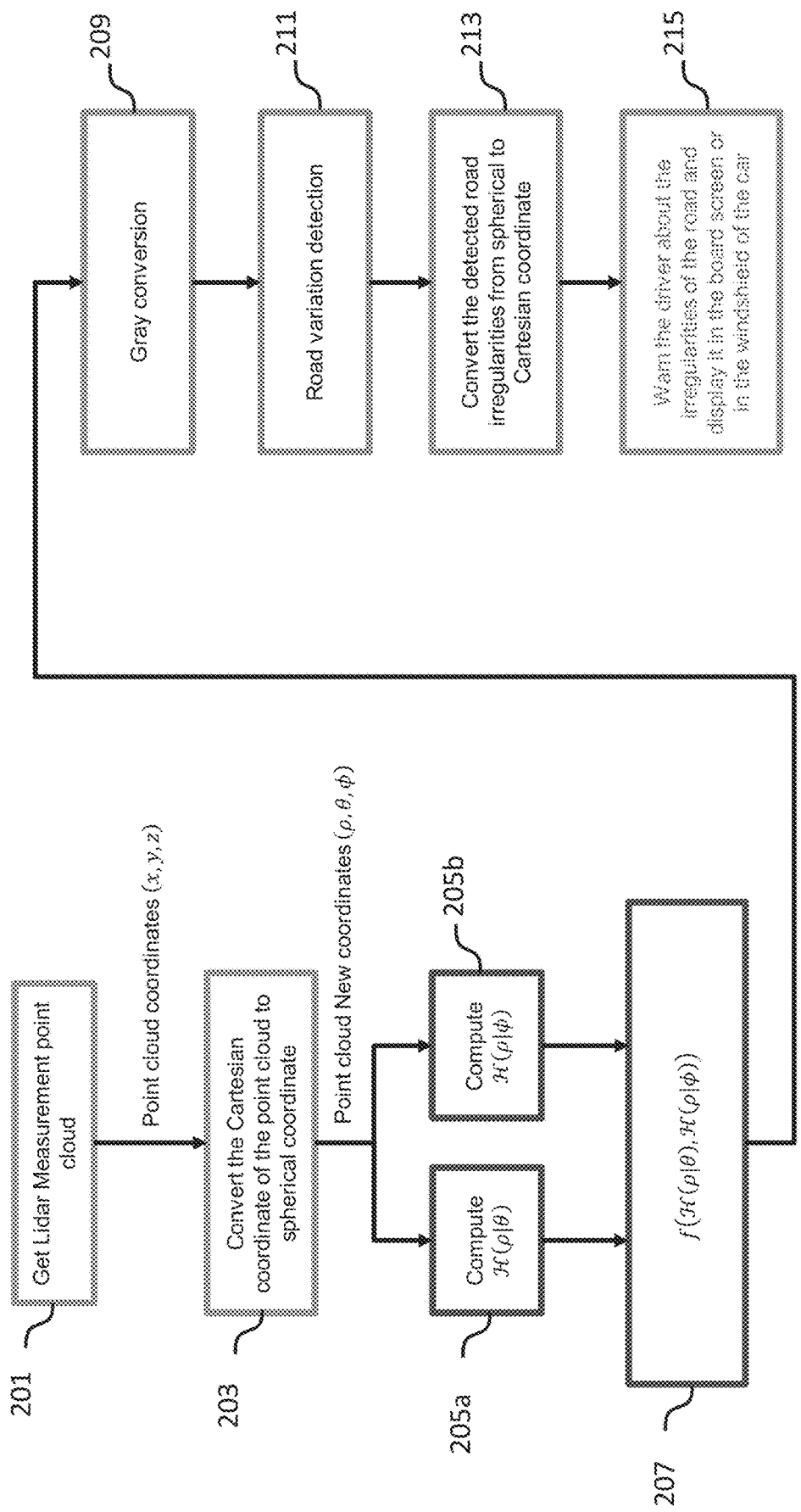
FIG. 2 is a schematic diagram illustrating processing blocks implemented by a sensing apparatus, according to an embodiment of the disclosure.

FIG. 2 is a schematic diagram illustrating processing blocks implemented by the sensing apparatus 103, according to an embodiment of the disclosure. In the exemplary embodiment shown in FIG. 2, the telemetric sensing system 107 comprises one or more lidar sensors 107.

Figure 3A:
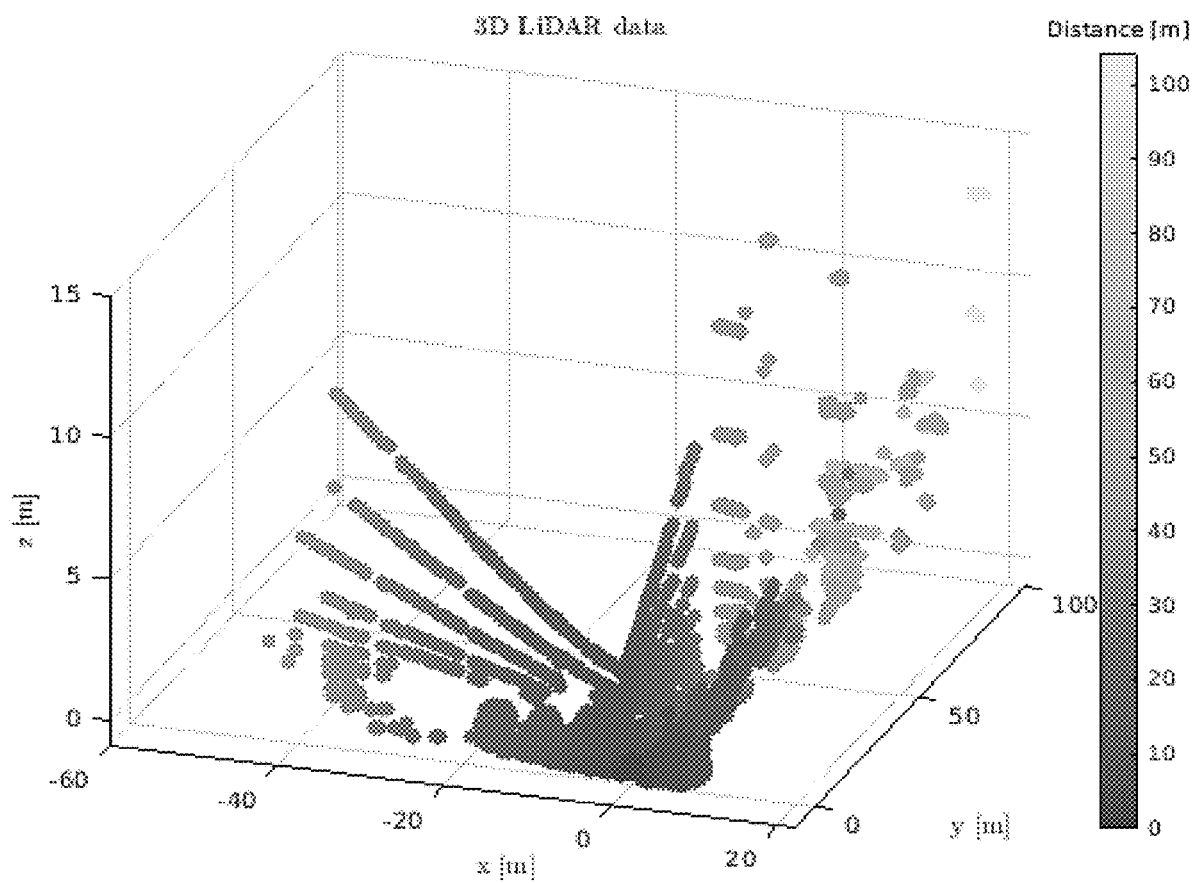
FIG. 3A shows a plurality of position vectors illustrated in the form of a point cloud as sensed by a sensing apparatus, according to an embodiment of the disclosure.
Figure 3B:
FIG. 3B shows an exemplary road scenario used for obtaining the plurality of position vectors illustrated in FIG. 3A.
Figure 3C:
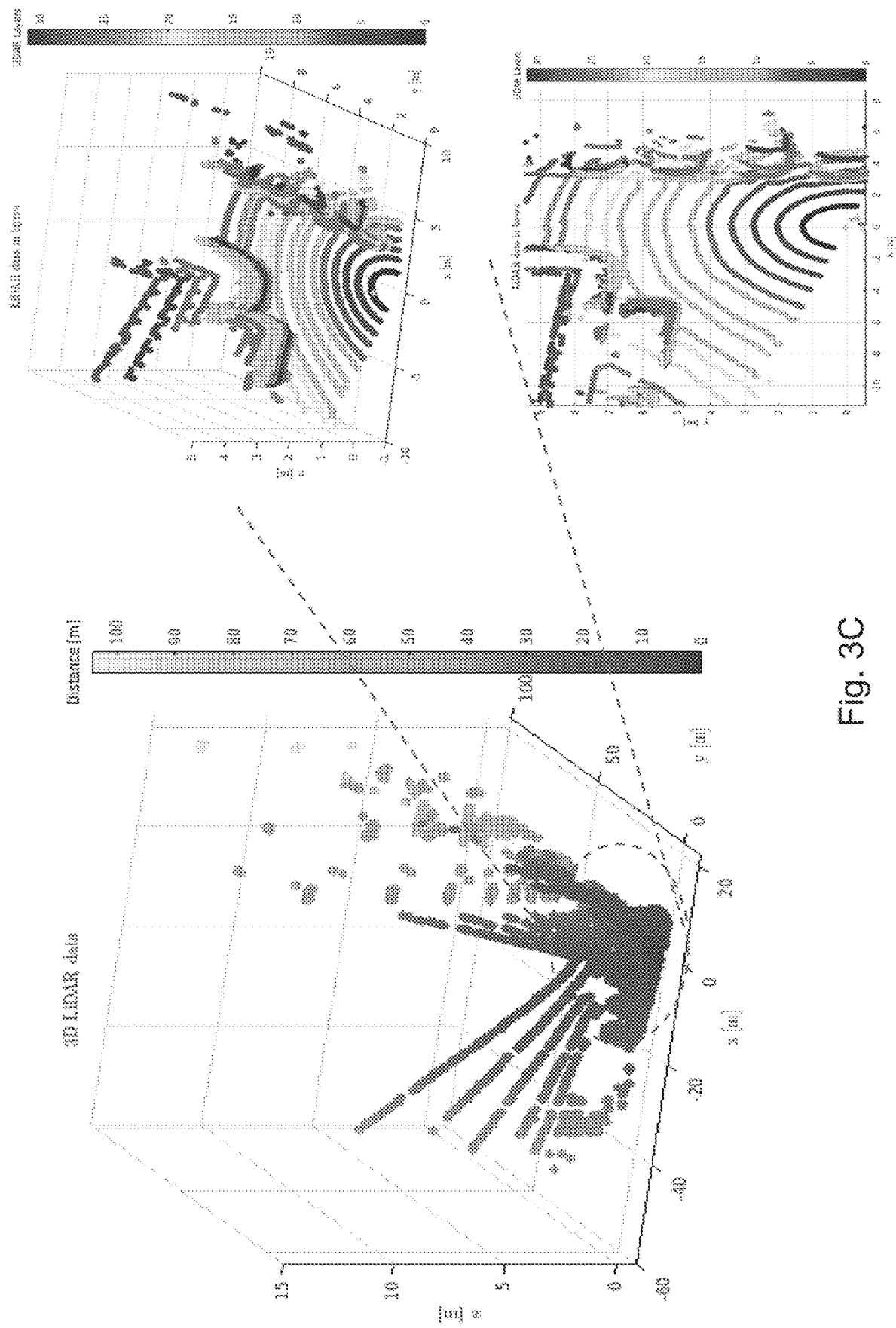
FIG. 3C shows more detailed views of the plurality of position vectors of FIG. 3A.

In block 201 of FIG. 2 the one or more lidar sensors 107 collect the plurality of position vectors by lidar sensing of the surface of the road the vehicle 100 is driving on. The plurality of position vectors may be represented as a point cloud, as illustrated in FIG. 3A for the exemplary road scenario shown in FIG. 3B. FIG. 3C shows more detailed views of the plurality of position vectors of FIG. 3A illustrated as a point cloud.

In the embodiment shown in FIG. 2, it is assumed that the or more lidar sensors 107 collect the plurality of position vectors in Cartesian coordinates, e.g., the end point of each position vector is defined by its coordinates x, y and z relative to the common origin defined, for instance, by the position(s) of the one or more lidar sensors 107 on the vehicle 100. The lidar data shown in FIGS. 3A and 3C are given in the Cartesian coordinate system. Applying a zoom on the central part of the data, e.g., focusing on the immediate vicinity of the vehicle 100, e.g., where the lidar sensors 107 are placed, circular shaped limits may be observed in FIGS. 3A and 3C that correspond to the natural scanning process performed by the lidar sensors 107. In free space for each elevation angle value, where there are no obstacles or road irregularities, e.g., where the road is perfectly flat, the lidar sensors 107 would return regular circles or regular arcs of circles that correspond to a perfect road. However, if obstacles are placed along the line of sight of the lidar sensor 107 or there are irregularities on the road, such as a speed bump or a pothole, these arcs of circles will not be regular anymore. A distortion to the center of the circle formed by an arc corresponds to a bump (e.g., obstacle) while a distortion to the other direction (e.g., outside of the regular circle) would represent a pothole.

Figure 4:
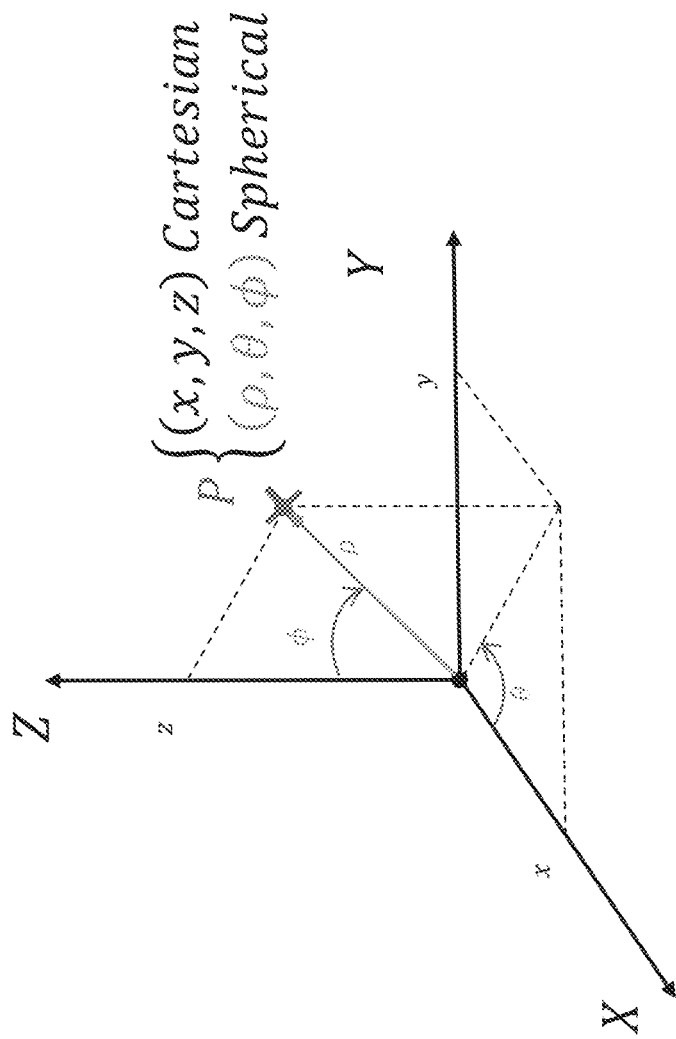
FIG. 4 illustrates the relationship between Cartesian and spherical or polar coordinates as used by a sensing apparatus, according to an embodiment of the disclosure.

In an embodiment, the sensing apparatus 103 is configured to convert each of the plurality of position vectors from Cartesian coordinates to spherical coordinates (block 203 of FIG. 2). The general relationship between Cartesian and spherical or polar coordinates as used by the sensing apparatus 100 according to an embodiment is illustrated in FIG. 4. Thus, after the conversion into spherical coordinates each of the plurality of position vectors may be described by a radial distance $\rho$ and a direction defined by a polar angle (e.g., elevational angle $\phi$) and an azimuth angle $\theta$.

Figure 5A:
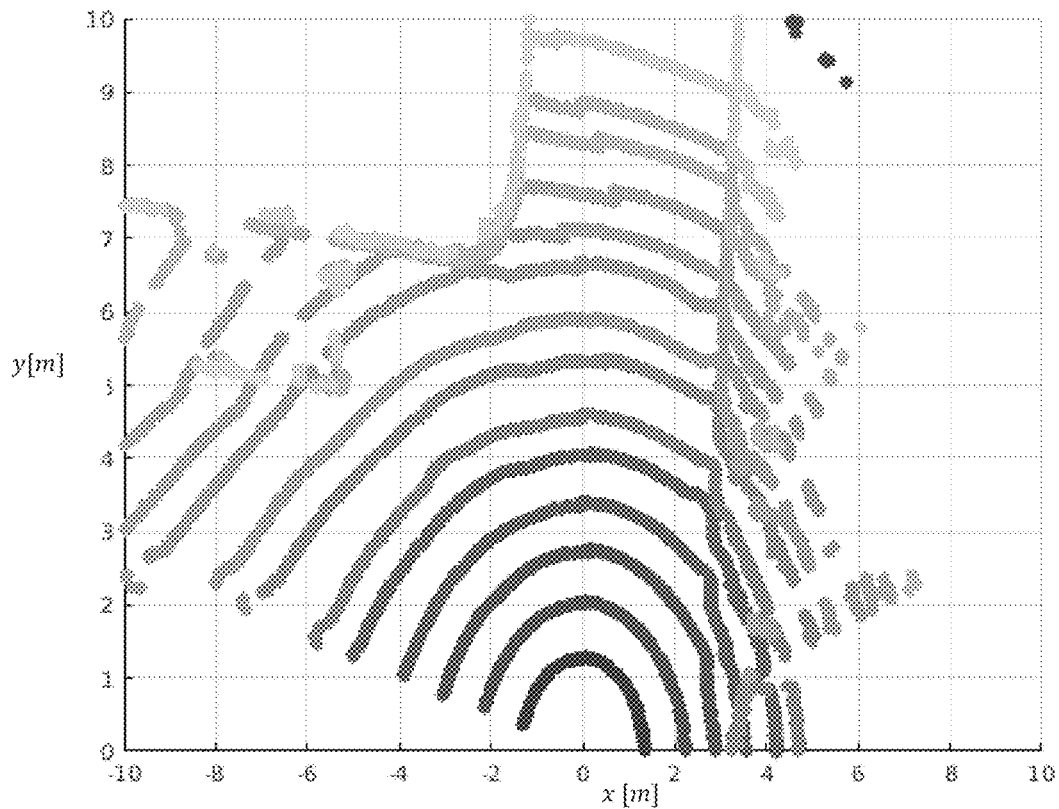
FIG. 5A shows a more detailed view of the data shown in FIG. 3C using Cartesian coordinates.
Figure 5B:
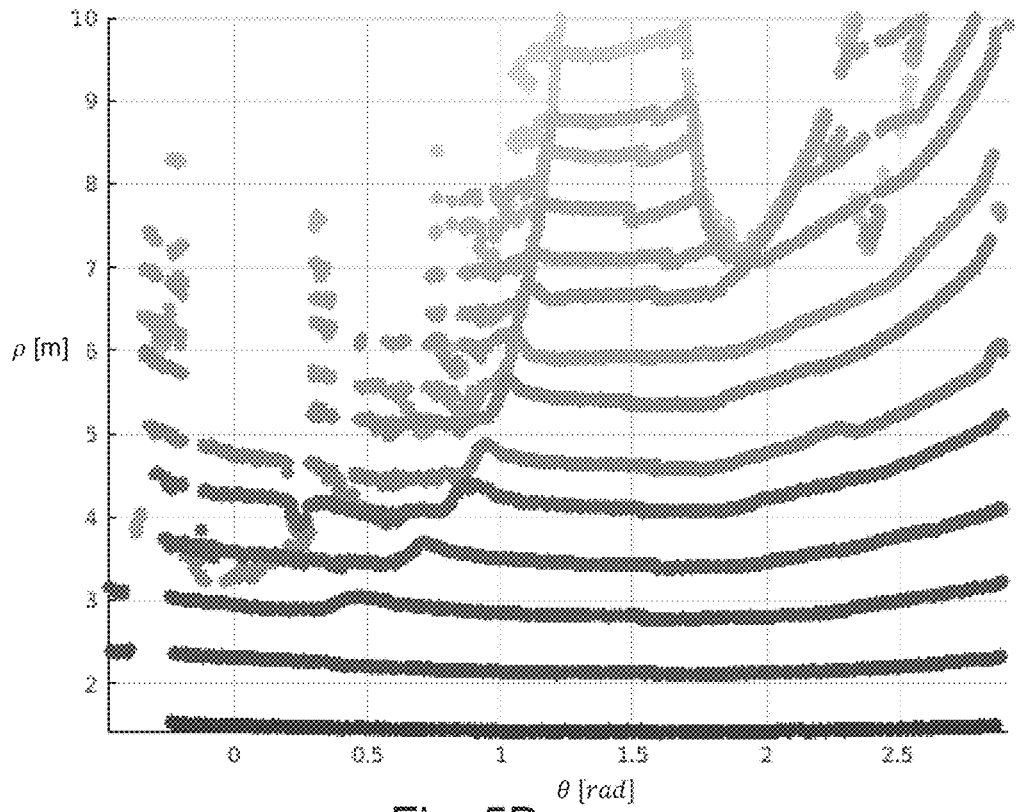
FIG. 5B shows a more detailed view of the data shown in FIG. 3C using spherical coordinates.
Figure 5C:
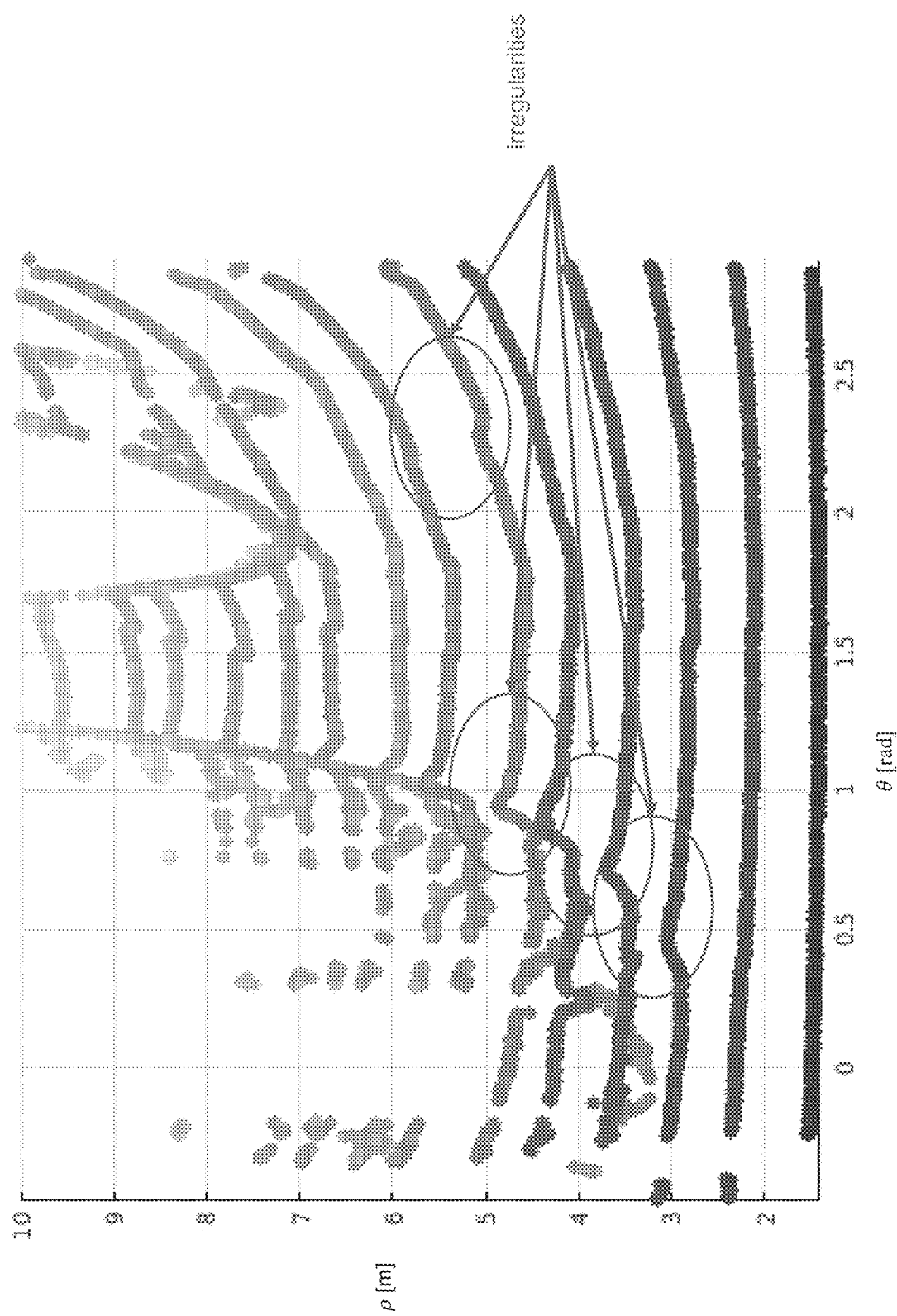
FIG. 5C shows a more detailed view of the data shown in FIG. 5B, where the signatures of exemplary road irregularities identified by a sensing apparatus have been marked, according to an embodiment of the disclosure.

The advantageous effect of converting the plurality of position vectors from Cartesian coordinates into spherical coordinates is illustrated in FIGS. 5A-C. FIG. 5A shows a more detailed view of the data shown in FIG. 3C using Cartesian coordinates, while FIG. 5B shows a more detailed view of the same data using spherical coordinates. A more detailed view of the data shown in FIG. 5B is shown in FIG. 5C, where the locations of four exemplary road irregularities, such as speed bumps or potholes, identifiable by the sensing apparatus 103 according to an embodiment have been marked. As will be appreciated, in an embodiment the sensing apparatus 103 according to an embodiment makes advantageous usage of the finding that these road irregularities are much more prominent in the representation using spherical coordinates (e.g., FIGS. 5B and 5C) than in the representation based on Cartesian coordinates (e.g., FIG. 5A).

Referring back to FIG. 2, as illustrated in blocks 205a and 205b thereof, for detecting a road flatness exception by evaluating variations of the lengths of the plurality of position vectors the processing circuitry 105 of the sensing apparatus 103 is configured to determine two entropy-related quantities denoted herein as $\mathcal{H}(\rho|\theta)$ and $\mathcal{H}(\rho|\phi)$ computed respectively according to the two dimensions $\theta$ and $\phi$. In an embodiment, these entropy-related quantities may be defined as follows:

$$\mathcal{H}(\rho \mid \theta) = \log_{10}\left(1 + \left|\frac{\partial \rho}{\partial \theta}\right|\right) \text{ and}$$

$$\mathcal{H}(\rho \mid \phi) = \log_{10}\left(1 + \left|\frac{\partial \rho}{\partial \phi}\right|\right),$$

where $\partial\rho/\partial\phi$ and $\partial\rho/\partial\theta$ are the partial derivatives of $\rho(\theta,\phi)$ with respect to $\phi$ and $\theta$ respectively, as will be described in more detail in the context of FIG. 9 below.

In block 207 of FIG. 2, for evaluating the variations of the lengths of the plurality of position vectors the processing circuitry 105 of the sensing apparatus 103 is configured to determine for each of the position vectors an entropy variation level by computing a function $f(\mathcal{H}(\rho|\theta), \mathcal{H}(\rho|\phi))$ which merges the result of entropy-related functions $\mathcal{H}(\rho|\theta)$ and $\mathcal{H}(\rho|\phi)$ determined in blocks 205a and 205b of FIG. 2. In an embodiment, as will be described in more detail in the context of FIG. 9 below, the processing circuitry 105 of the sensing apparatus 103 is configured to determine the following function:

$$f(\mathcal{H}(\rho \mid \theta), \mathcal{H}(\rho \mid \phi)) = 10\left(\log_{10}\left(1 + \left|\frac{\partial \rho}{\partial \theta}\right|\right) + \log_{10}\left(1 + \left|\frac{\partial \rho}{\partial \phi}\right|\right)\right),$$

wherein | | denotes the absolute value, for merging the entropy-related functions $\mathcal{H}(\rho|\theta)$ and $\mathcal{H}(\rho|\phi)$ determined in blocks 205a and 205b of FIG. 2.

In an embodiment, the one or more radar and/or lidar sensors 107 of the telemetric sensing system 107 may be configured to collect the plurality of position vectors in a rotating operation mode, e.g., where the one or more radar and/or lidar sensors 107 scan the full range of the azimuth angle $\theta$ for a plurality of fixed polar angles (e.g., elevational angles $\phi$). In other words, in an embodiment the one or more radar and/or lidar sensors 107 may be configured to collect the plurality of position vectors such that a plurality of subsets of the plurality of position vectors have the same polar angle.

Figure 6A:
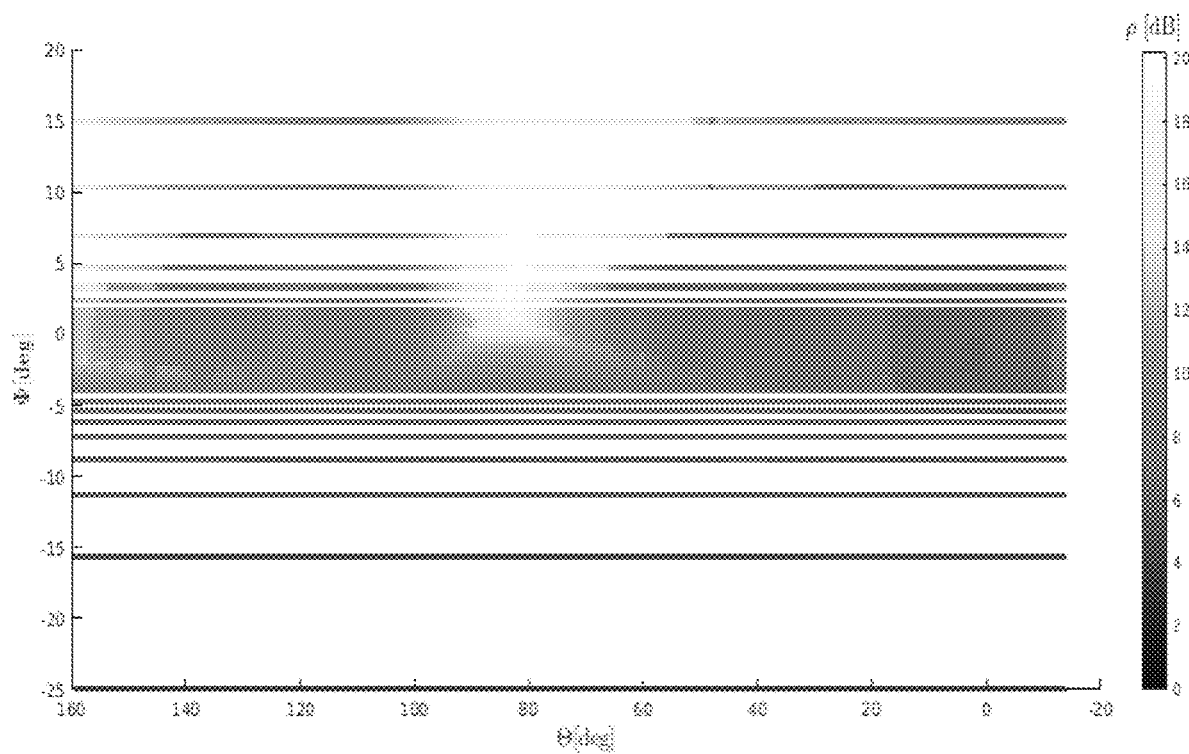
FIG. 6A shows an intensity map based on a plurality of position vectors obtained by a plurality of radar and/or lidar sensors of a sensing apparatus operating in a rotating mode, according to an embodiment of the disclosure.
Figure 6B:
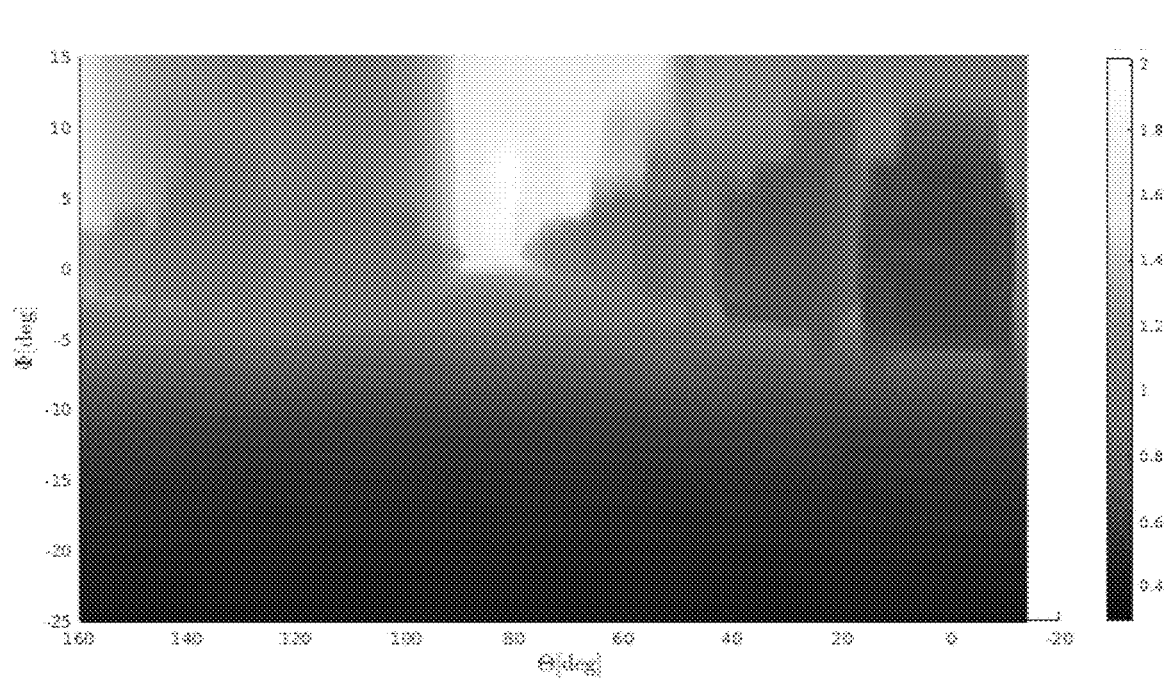
FIG. 6B shows an intensity map obtained by a sensing apparatus on the basis of the intensity map of FIG. 6A using interpolation, according to an embodiment of the disclosure.

FIG. 6 shows an exemplary intensity map based on a plurality of position vectors obtained by the one or more radar and/or lidar sensors 107 of the sensing apparatus 103 according to an embodiment operating in a rotating mode. For processing the plurality of position vectors obtained using a rotating operation mode the processing circuitry 105 of the sensing apparatus 103 may be configured to determine further position vectors by interpolating the lengths of position vectors obtained by the one or more radar and/or lidar sensors 107. In an embodiment, the processing circuitry 105 is configured to determine a length for a plurality of interpolation vectors, e.g., interpolated position vectors based on an interpolation of the length of one or more position vectors having a larger polar angle and the length of one or more position vectors having a smaller polar angle. FIG. 6B shows an intensity map, e.g., a two-dimensional data array, obtained by the sensing apparatus 100 according to an embodiment on the basis of the intensity map of FIG. 6A using interpolation. As will be appreciated, in the intensity maps shown in FIGS. 6A and 6B the x-axis corresponds to the azimuth angle and the y-axis corresponds to the polar angle of each position vector, while the intensity value is associated with the radial distance of the position vector extending in the direction defined by the azimuth angle and the polar angle.

In an embodiment, evaluating variations of the lengths of position vectors comprises evaluating a directional derivate of a length function, wherein the length function is an interpolation of the lengths of the position vectors on an angular domain.

Figure 7A:
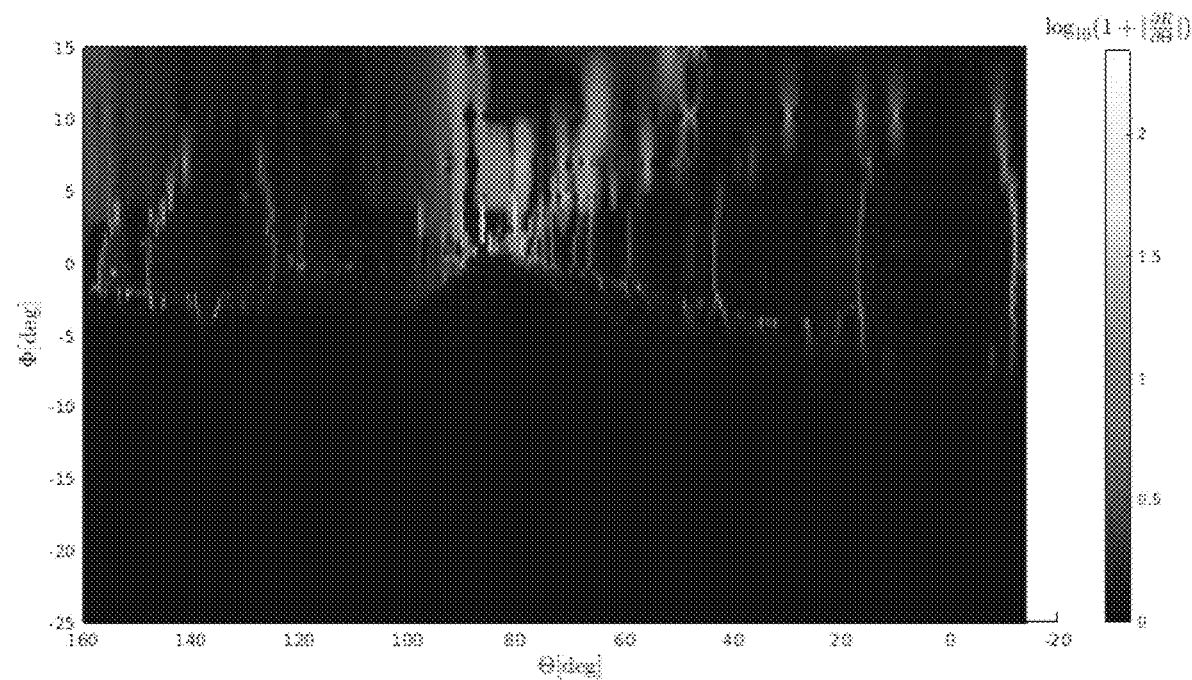
FIG. 7A shows an intensity map based on a first directional derivative of the intensity map of FIG. 6B.
Figure 7B:
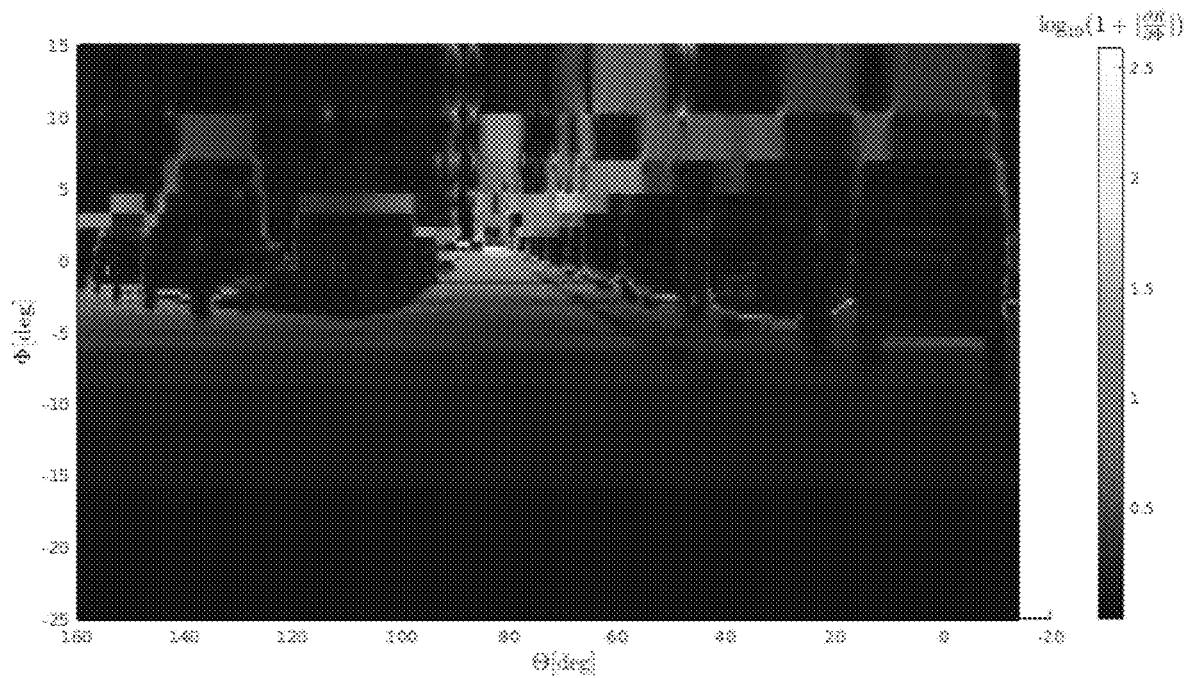
FIG. 7B shows an intensity map based on a second directional derivative of the intensity map of FIG. 6B.
Figure 7C:
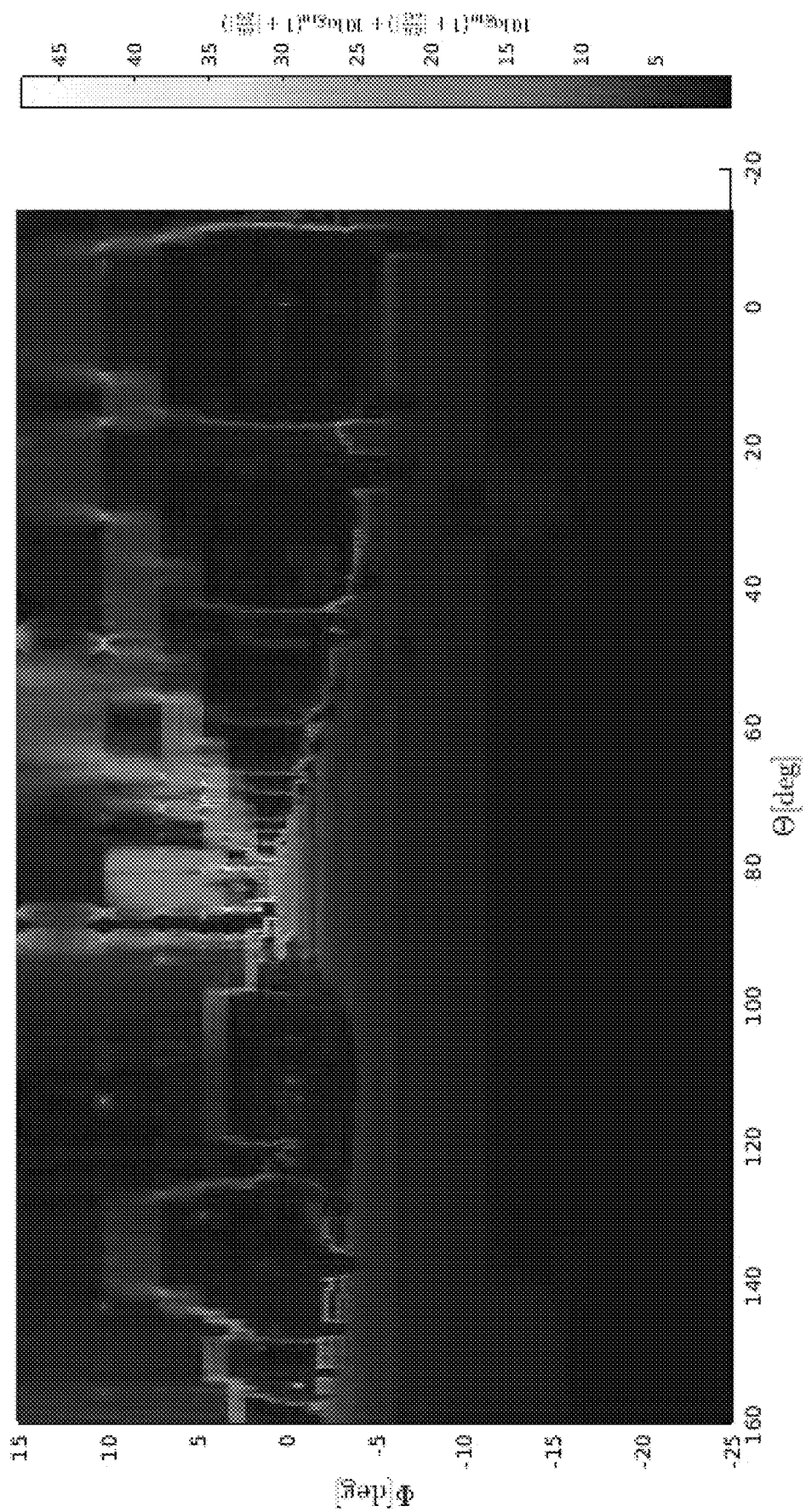
FIG. 7C shows an intensity map based on a combination of the intensity maps of FIGS. 7A and 7B.

FIG. 7A shows the intensity map generated by the sensing apparatus 103 in processing block 205a of FIG. 2 on the basis of the intensity map shown in FIG. 6B, while FIG. 7B shows the intensity map generated by the sensing apparatus 103 in processing block 205b of FIG. 2 on the basis of the intensity map shown in FIG. 6B. More specifically, in this embodiment the processing circuitry 105 is configured to compute the function $$\mathcal{H}(\rho \mid \theta) = \log_{10}\left(1 + \left|\frac{\partial \rho}{\partial \theta}\right|\right),$$

e.g., using a first directional derivative for generating the intensity map shown in FIG. 7A and to compute the function $$\mathcal{H}(\rho \mid \phi) = \log_{10}\left(1 + \left|\frac{\partial \rho}{\partial \phi}\right|\right),$$

e.g., using a second directional derivative for generating the intensity map shown in FIG. 7B. FIG. 7C shows an intensity map based on a combination of the intensity maps of FIGS. 7A and 7B namely the function $$f(\mathcal{H}(\rho \mid \theta), \mathcal{H}(\rho \mid \phi)) = 10\left(\log_{10}\left(1 + \left|\frac{\partial \rho}{\partial \theta}\right|\right) + \log_{10}\left(1 + \left|\frac{\partial \rho}{\partial \phi}\right|\right)\right)$$

computed by the processing circuitry 105 of the sensing apparatus 103 for evaluating variations of the lengths of the plurality of position vectors.

Referring back to FIG. 2, in block 209 thereof the processing circuitry 105 of the sensing apparatus 103 is configured to perform a grayscale conversion of the two-dimensional intensity map shown in FIG. 7C. FIG. 8A shows a gray converted version of the intensity map of FIG. 7C.

In block 211 of FIG. 2, the processing circuitry 105 of the sensing apparatus 103 is configured to detect a road flatness exception on the basis by (a) evaluating deviations of the lengths of the position vectors with respect to reference lengths corresponding to a hypothetical flat road surface or (b) evaluating variations of the lengths of the position vectors. In an embodiment, the processing circuitry 105 is configured to detect a road flatness exception on the basis of a known contour detection algorithm configured to detect contours in the two-dimensional intensity map shown in FIG. 8A. FIG. 8B shows the intensity map of FIG. 8A as well as a contour identified therein by the sensing apparatus 100 according to an embodiment.

In block 213 of FIG. 2, the processing circuitry 105 of the sensing apparatus 103 may convert for any detected road irregularities the positions thereof back from spherical coordinates to Cartesian coordinates.

In block 215 of FIG. 2, the sensing apparatus 103 may trigger the advanced driver assistance system 101 to alert a driver 100 of the vehicle 100 about the detected road irregularity, such as by generating an alert message or signal in case the sensing apparatus 103 detects a speed bump or a pothole on the road ahead of the vehicle, so that the driver of the vehicle 100 and or the advanced driver assistance system 101 can take appropriate measures for avoiding the road irregularity, such as slowing down the vehicle 100.

Figure 9:
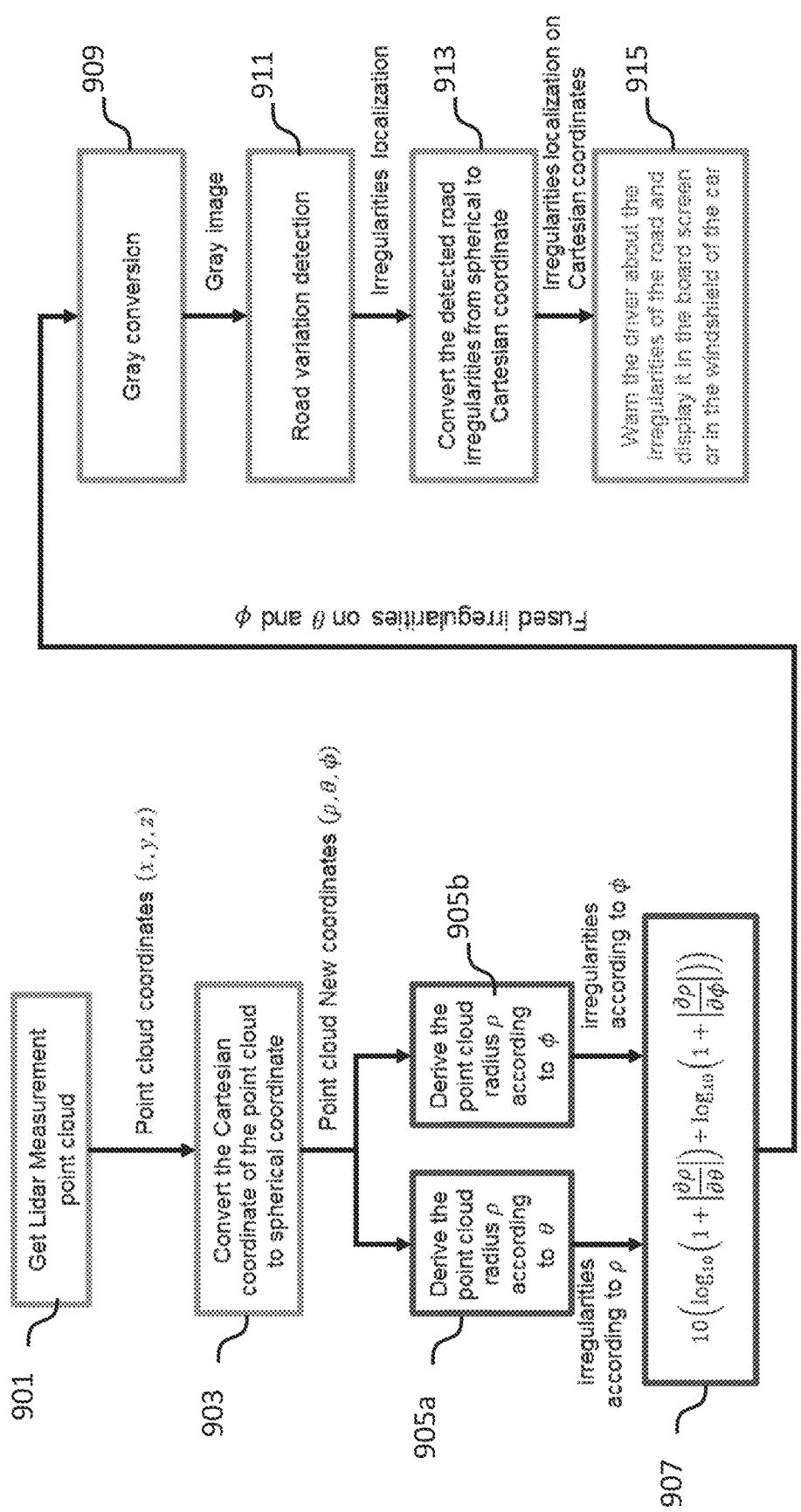
FIG. 9 is a schematic diagram illustrating processing blocks implemented by a sensing apparatus, according to an embodiment of the disclosure.

FIG. 9 is a schematic diagram illustrating processing blocks implemented by the sensing apparatus 100 according to an embodiment, which is very similar to the embodiment shown in FIG. 2. Therefore, in the following only the differences between the embodiments shown in FIGS. 2 and 9 will be described in more detail, namely processing blocks 905a, 905b and 907 of FIG. 9.

In blocks 905a and 905b of FIG. 9, for detecting a road flatness exception by evaluating variations of the lengths of the plurality of position vectors the processing circuitry 105 of the sensing apparatus 103 is configured to the following entropy-related quantities: $\mathcal{H}(\rho|\theta)=\partial\rho/\partial\theta$ and $\mathcal{H}(\rho|\phi)=\partial\rho/\partial\phi$, where $\partial\rho/\partial\theta$ and $\partial\rho/\partial\phi$ are the partial derivative of $\rho(\theta,\phi)$ with respect to $\phi$ and $\theta$ respectively.

In block 907 of FIG. 9, for evaluating the variations of the lengths of the plurality of position vectors, the processing circuitry 105 of the sensing apparatus 103 is configured to determine for each of the position vectors an entropy variation level by computing the following function:

$$f(\mathcal{H}(\rho|\theta), \mathcal{H}(\rho|\phi)) = 10\left(\log_{10}\left(1 + \left|\frac{\partial\rho}{\partial\theta}\right|\right) + \log_{10}\left(1 + \left|\frac{\partial\rho}{\partial\phi}\right|\right)\right),$$

which merges the entropy-related functions determined in blocks 905a and 905b of FIG. 9.

As already described above, the processing circuitry 105 of the sensing apparatus 103 may be configured to evaluate the lengths of the position vectors by (a) evaluating deviations of the lengths of the position vectors with respect to reference lengths corresponding to a hypothetical flat road surface, or (b) evaluating variations of the lengths of the position vectors. While in the embodiments described above the processing circuitry 105 of the sensing apparatus 103 is configured to evaluate variations of the lengths of the position vectors for detecting road irregularities, in the following embodiments will be described, where the processing circuitry 105 of the sensing apparatus 103 is configured to evaluate deviations of the lengths of the position vectors with respect to reference lengths corresponding to a hypothetical flat road surface for detecting road irregularities.

Figure 10A:
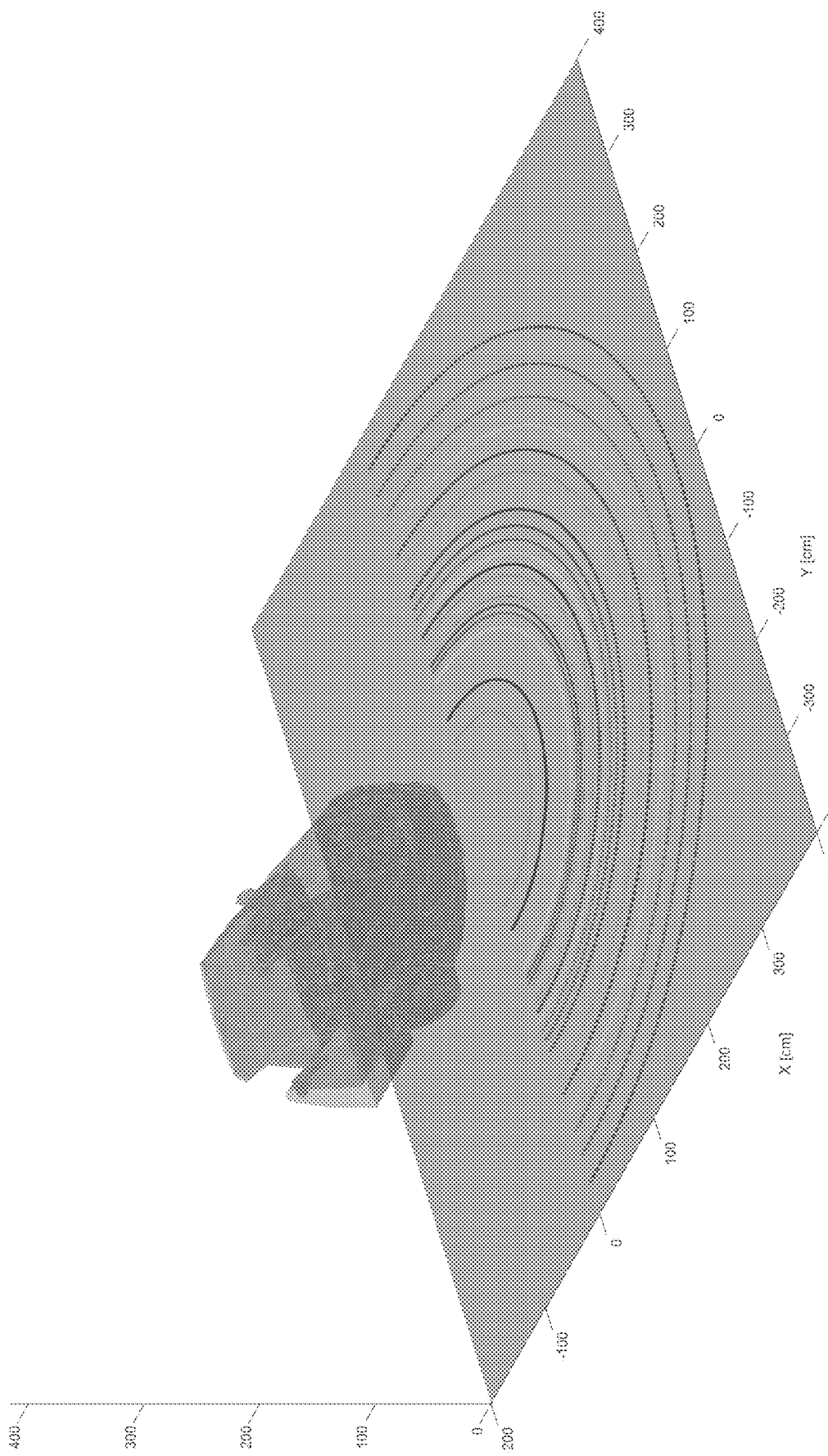
FIGS. 10A, 10B and 10C illustrate different aspects of a sensing apparatus making use of one or more reference lengths, according to an embodiment of the disclosure.

In an embodiment, the reference lengths may be based on the reflections on the horizontal plane formed by the wheels of the vehicle, e.g., the xy-plane of FIG. 10A. The reference lengths may be the position vectors on the hypothetical flat road surface, e.g., the arc of circles in the xy-plane of FIG. 10A. These points correspond to the intersection of rays generated at $(\theta,\phi)$ with the xy-plane, e.g., the hypothetical flat road surface. For obtaining such reference points the sensing apparatus 103 may be operated in a vehicle 100 driving or standing on a flat horizontal road. Several passes followed by an average would help to reduce the measurement noise. These reference points may then be stored in a memory of the sensing apparatus 103.

Figure 10B:
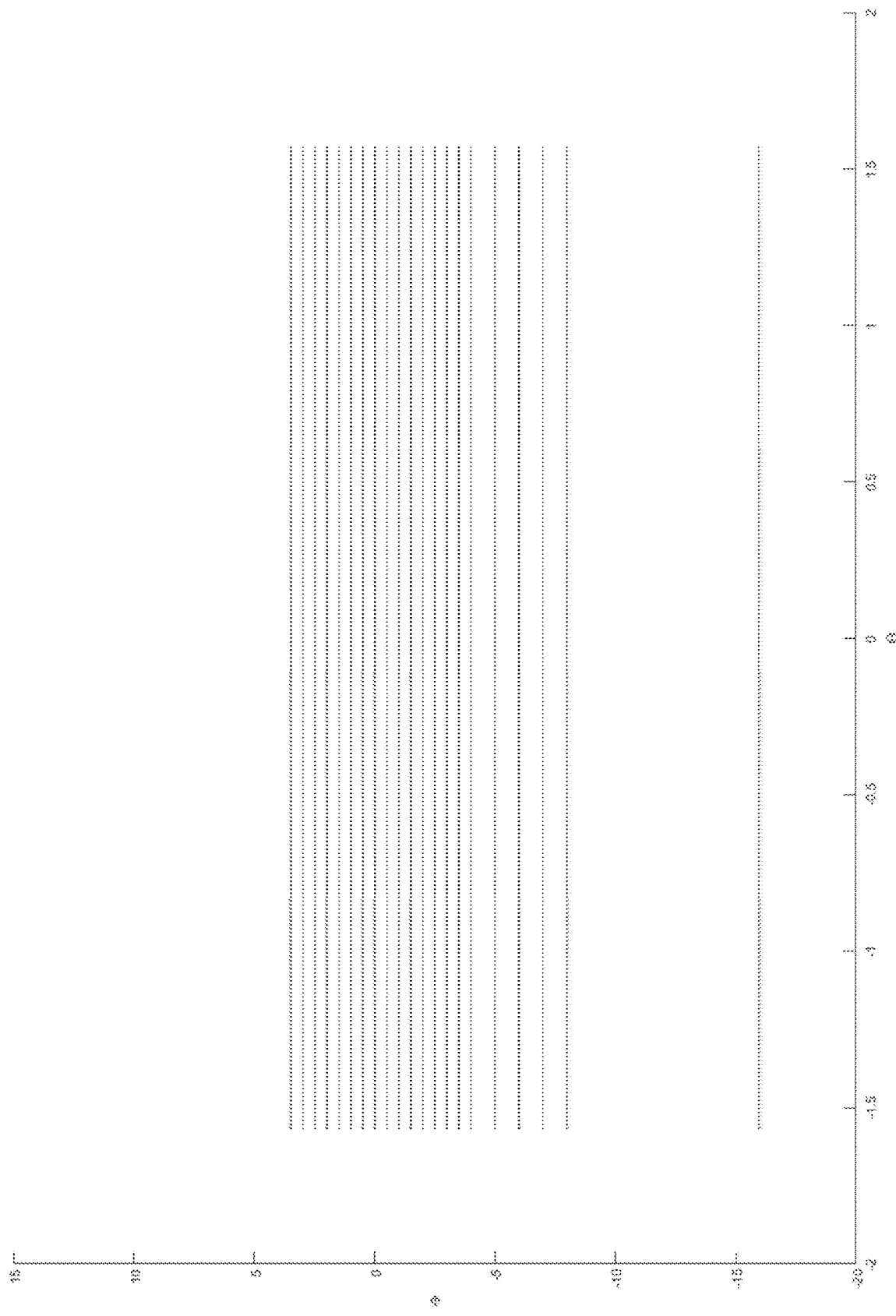
Figure 10C:
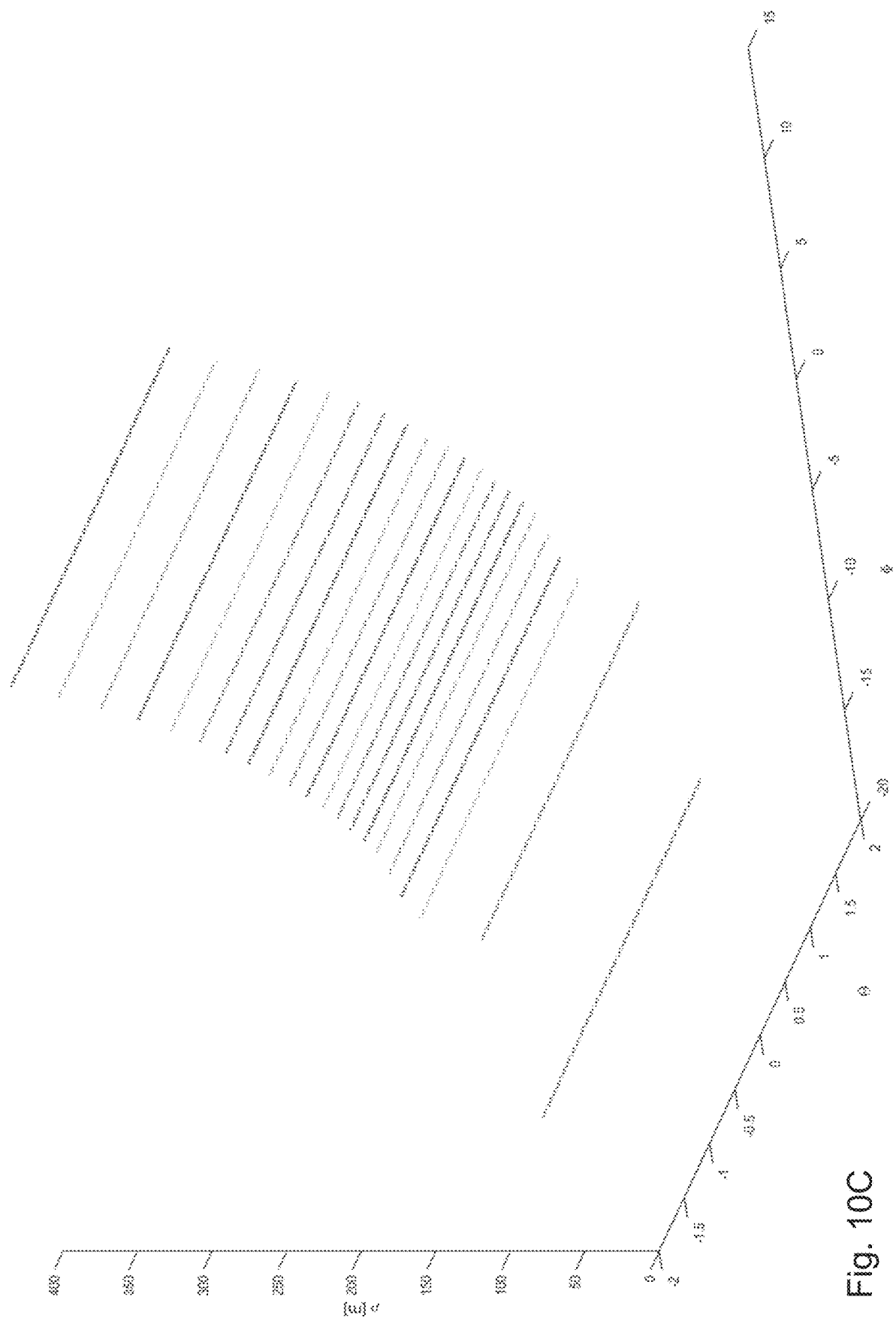

According to a further embodiment, the sensing apparatus 103 is configured to generate the reference points itself. In fact, knowing the arrangement of the one or more lidar sensors 107 on the vehicle 100, it is possible to determine how the measurements will look like when the vehicle would be driving or standing on a hypothetical flat road surface. These reference points may be stored in the memory of the sensing apparatus 103, for instance, in the form of a three-dimensional matrix, which associates a reference radial distance with every direction, e.g., $(\theta,\phi)$. In a Cartesian coordinate system the plurality of reference points would define arcs of circles as shown in FIG. 10A, while in spherical coordinates the plurality of reference points would define straight horizontal lines, as illustrated in FIG. 10B (front view) and FIG. 10C (side view).

Figure 11:
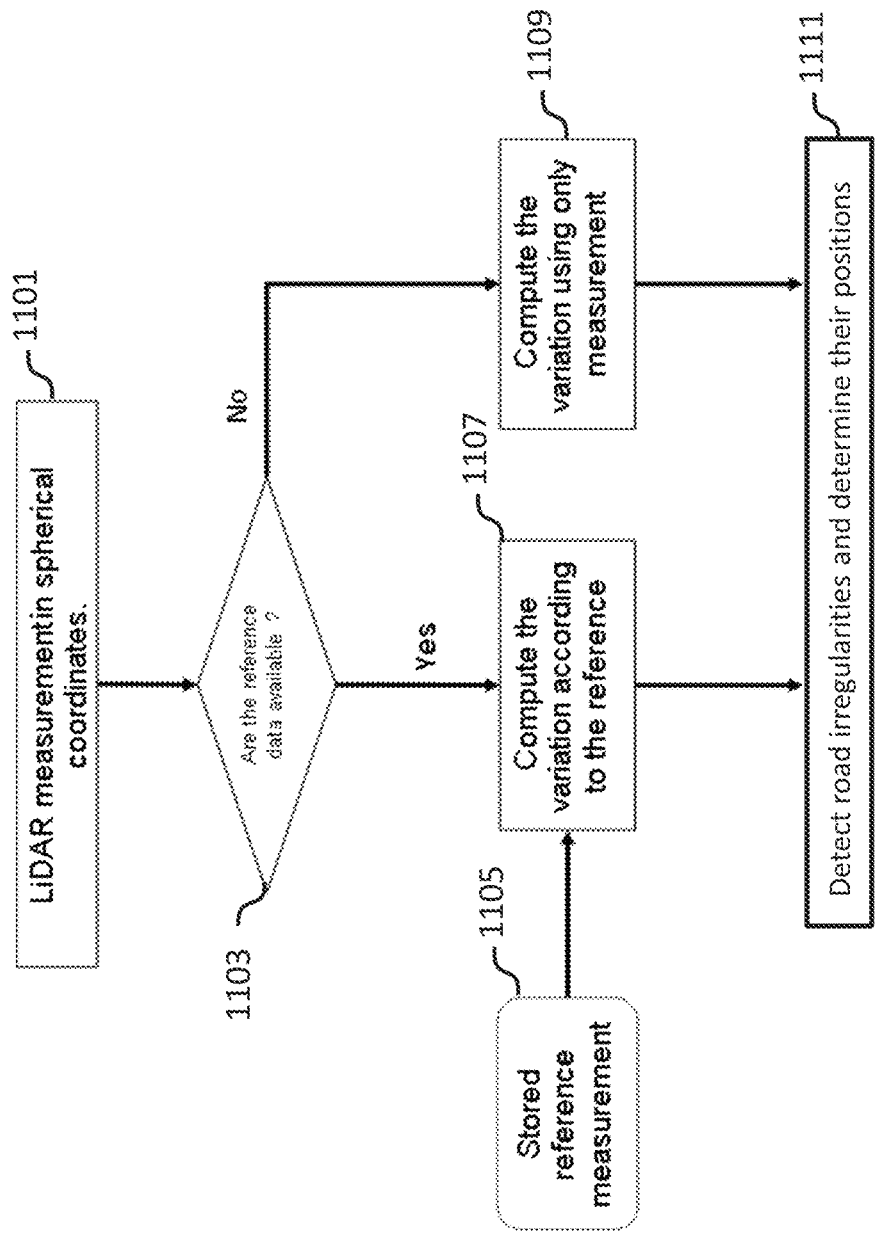
FIG. 11 is a schematic diagram illustrating processing blocks implemented by a sensing apparatus, according to an embodiment of the disclosure.

FIG. 11 is a schematic diagram illustrating processing blocks implemented by the sensing apparatus 103 according to a further embodiment, where reference points, when available, may be taken into account for detecting speed bumps and/or potholes on a road.

In block 1101 of FIG. 11 the measurements, e.g., the plurality of position vectors are provided in spherical coordinates.

In block 1103 of FIG. 11 the processing circuitry 105 of the sensing apparatus 103 determines whether any suitable reference points are available, If this is the case, the sensing apparatus 103 will use the stored reference values (block 1105 of FIG. 11) for evaluating deviations of the lengths of the measured position vectors with respect to the reference lengths (step 1107 of FIG. 11).

If the reference data is not available, the sensing apparatus 103 determines variations of the lengths of the measured position vectors for detecting road irregularities (block 1109 of FIG. 11), as described in great detail in the context of the embodiments described above.

In block 1111 of FIG. 11 the sensing apparatus 103 determines the positions of any road irregularities on the basis of the output provided by block 1107 or block 1109.

Figure 12:
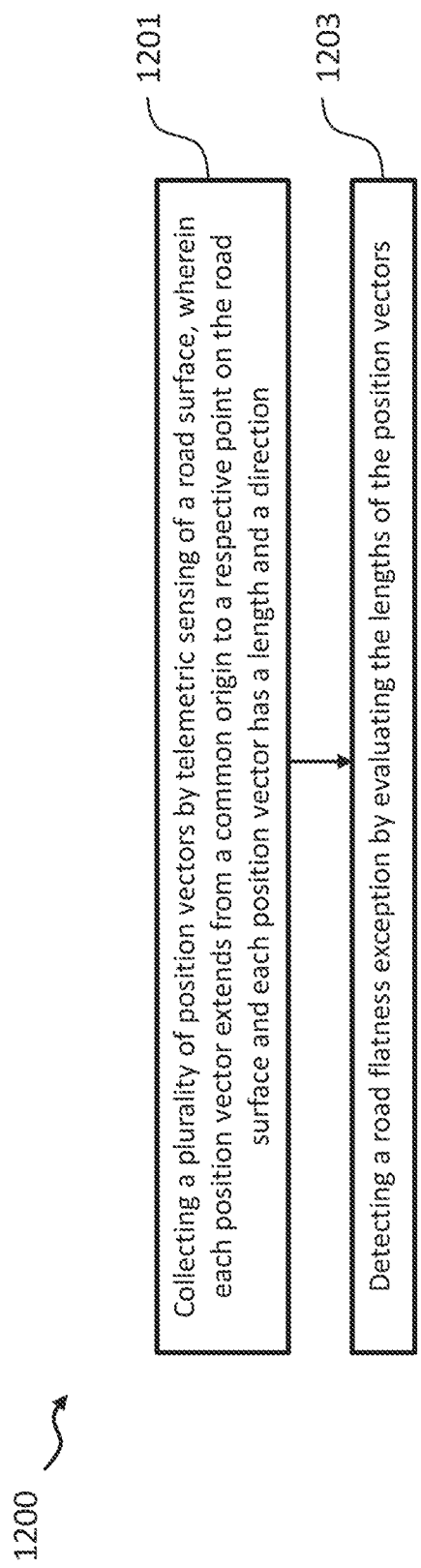
FIG. 12 is a flow diagram illustrating different steps of a sensing method, according to an embodiment of the disclosure.

FIG. 12 is a flow diagram illustrating different steps of a sensing method 1200 according to an embodiment. The sensing method 1200 comprises the steps of: collecting 1201 a plurality of position vectors by telemetric sensing of a road surface, wherein each position vector extends from a common origin to a respective point on the road surface and each position vector has a length and a direction; and detecting 1203 a road flatness exception by evaluating the lengths of the position vectors.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

What is claimed is:

1. A sensing apparatus for detecting irregularities on a road, wherein the sensing apparatus comprises:
 a telemetric sensing system configured to collect a plurality of position vectors by telemetric sensing of a road surface, each position vector extending from a common origin to a respective point on the road surface, each position vector having a length and a direction; and
 a processing circuitry configured to detect a road flatness exception by evaluating the lengths of the position vectors, wherein evaluating the lengths of the position vectors comprises:
 evaluating deviations of the lengths of the position vectors with respect to reference lengths corresponding to a hypothetical flat road surface, or
 evaluating variations of the lengths of the position vectors.

2. The sensing apparatus of claim 1, wherein the direction of each position vector comprises a polar angle and an azimuth angle.

3. The sensing apparatus of claim 2, wherein the telemetric sensing system is configured to collect the plurality of position vectors such that, within each subset of a plurality of subsets of the plurality of position vectors, each position vector in the subset has the same polar angle.

4. The sensing apparatus of claim 3, wherein the processing circuitry is further configured to determine a length for a plurality of interpolation vectors based on an interpolation of the length of one or more position vectors having a larger polar angle and the length of one or more position vectors having a smaller polar angle.

5. The sensing apparatus of claim 4, wherein the processing circuitry is configured to generate, on the basis of the plurality of position vectors and the plurality of interpolation vectors, a two-dimensional data array, wherein the dimensions of each element of the two-dimensional data array correspond to the azimuth angle and the polar angle of a corresponding position vector or interpolation vector, and wherein a value of each element of the two-dimensional data array is associated with a variation of a length function for the respective azimuth angle and polar angle.

6. The sensing apparatus of claim 5, wherein the processing circuitry is further configured to perform a grayscale conversion of the two-dimensional data array.

7. The sensing apparatus of claim 6, wherein the processing circuitry is configured to detect the road flatness exception on the basis of a contour detection algorithm configured to detect contours in the two-dimensional data array.

8. The sensing apparatus of claim 1, wherein evaluating variations of the lengths of position vectors comprises evaluating a directional derivate of a length function, the length function being an interpolation of the lengths of the position vectors on an angular domain.

9. The sensing apparatus of claim 8, wherein evaluating variations of the lengths of position vectors comprises evaluating:

$$10\left(\log_{10}\left(1+\left|\frac{\partial \rho}{\partial \theta}\right|\right)+\log_{10}\left(1+\left|\frac{\partial \rho}{\partial \phi}\right|\right)\right),$$

wherein $\rho$ denotes the length function, $\theta$ denotes an azimuth angle, and $\phi$ denotes a polar angle.

10. The sensing apparatus of claim 1, wherein collecting the plurality of position vectors comprises transforming each of the position vectors from Cartesian coordinates to spherical coordinates.

11. The sensing apparatus of claim 1, wherein the telemetric sensing system comprises one or more radar sensors or one or more lidar sensors.

12. An advanced driver assistance system for a vehicle, wherein the advanced driver assistance system comprises a sensing apparatus according to claim 1, and wherein the advanced driver assistance system is configured to generate an alert message or a signal responsive to the sensing apparatus detecting an irregularity on a road ahead of the vehicle.

13. A sensing method for detecting irregularities on a road, wherein the sensing method comprises:
 collecting, via a telemetric sensing system, a plurality of position vectors by telemetric sensing of a road surface, each position vector extending from a common origin to a respective point on the road surface, each position vector having a length and a direction; and
 detecting, via a processor, a road flatness exception by evaluating the lengths of the position vectors, wherein evaluating the lengths of the position vectors comprises:
 evaluating deviations of the lengths of the position vectors with respect to reference lengths corresponding to a hypothetical flat road surface, or
 evaluating variations of the lengths of the position vectors.

14. The sensing method of claim 13, wherein the direction of each position vector comprises a polar angle and an azimuth angle.

15. The sensing method of claim 14, wherein the telemetric sensing system is configured to collect the plurality of position vectors such that, within each subset of a plurality of subsets of the plurality of position vectors, each position vector in the subset has the same polar angle.

16. The sensing method of claim 15, wherein the processor is further configured to determine a length for a plurality of interpolation vectors based on an interpolation of the length of one or more position vectors having a larger polar angle and the length of one or more position vectors having a smaller polar angle.

17. The sensing method of claim 16, wherein the processor is further configured to generate, on the basis of the plurality of position vectors and the plurality of interpolation vectors, a two-dimensional data array, wherein the dimensions of each element of the two-dimensional data array correspond to the azimuth angle and the polar angle of a corresponding position vector or interpolation vector, and wherein a value of each element of the two-dimensional data array is associated with a variation of a length function for the respective azimuth angle and polar angle.

18. The sensing method of claim 13, wherein evaluating variations of the lengths of position vectors comprises evaluating a directional derivate of a length function, the length function being an interpolation of the lengths of the position vectors on an angular domain.

19. The sensing method of claim 18, wherein evaluating variations of the lengths of position vectors comprises evaluating:

$$10\left(\log_{10}\left(1+\left|\frac{\partial\rho}{\partial\theta}\right|\right)+\log_{10}\left(1+\left|\frac{\partial\rho}{\partial\phi}\right|\right)\right),$$

wherein $\rho$ denotes the length function, $\theta$ denotes an azimuth angle, and $\phi$ denotes a polar angle.

20. The sensing method of claim 13, wherein collecting the plurality of position vectors comprises transforming each of the position vectors from Cartesian coordinates to spherical coordinates.

* * * * *

UNITED STATES PATENT AND TRADEMARK OFFICE
CERTIFICATE OF CORRECTION

| | | |
|---|---|---|
| PATENT NO. | : 12,165,511 B2 | Page 1 of 1 |
| APPLICATION NO. | : 18/073332 | |
| DATED | : December 10, 2024 | |
| INVENTOR(S) | : Mekki et al. | |

It is certified that error appears in the above-identified patent and that said Letters Patent is hereby corrected as shown below:

On the Title Page

Page 2: item (56) References Cited, Foreign Patent Documents: "IN107507202 A" should read as -- CN107507202 A --.

Page 2: item (56) References Cited, Foreign Patent Documents: "IN110015304A" should read as -- CN110015304 A --.

Signed and Sealed this
Third Day of June, 2025

Coke Morgan Stewart
*Acting Director of the United States Patent and Trademark Office*